United States Patent [19]

Villarreal

[11] Patent Number: 4,693,042
[45] Date of Patent: Sep. 15, 1987

[54] SYSTEM OF FLOOD PROTECTION FOR BUILDINGS

[76] Inventor: Carlos E. Villarreal, 22615 Pebworth Pl., Spring, Tex. 77373

[21] Appl. No.: 920,751

[22] Filed: Oct. 20, 1986

[51] Int. Cl.⁴ ............................................. E02D 27/00
[52] U.S. Cl. .................................... 52/169.14; 52/202
[58] Field of Search .................... 52/169.14, DIG. 12, 52/202, 4

[56] References Cited

U.S. PATENT DOCUMENTS

| | | | |
|---|---|---|---|
| 3,715,843 | 2/1973 | Ballinger | 52/DIG. 12 X |
| 4,019,304 | 4/1977 | Timm | 52/202 X |
| 4,425,744 | 1/1984 | Villareal | 52/169.14 |
| 4,488,386 | 12/1984 | Thompson | 52/169.14 X |

Primary Examiner—Carl D. Friedman
Attorney, Agent, or Firm—Neal J. Mosely

[57] ABSTRACT

A system of flood protection for buildings comprises a lower skirt of plastic film secured by a waterproof seal to the building foundation, an upper skirt of plastic film secured to an upper level of the building above the maximum projected rise of flood waters, and side skirts secured at each side of the upper and lower skirts. The skirts form adjoining continuous enclosures which extend completely around the building and are of a size and shape permitting each skirt to be unfolded or unwound to meet the other. The edges of each skirt have waterproof seals, such as a zip-lock seal, for water proof sealing to protect the building against rising waters. Upper, lower, and side peripheral enclosures are provided on the building in which the respective skirts are stored when not in use. Alternatively, enclosures are provided only for the lower and side skirts. The lower skirt is secured at its lower edge by a waterproof seal to the building foundation and its upper edge is secured to series of fasteners on an upper level of the building above the maximum projected rise of flood waters. The side skirts are secured at each side of the lower skirt.

33 Claims, 14 Drawing Figures

SYSTEM OF FLOOD PROTECTION FOR BUILDINGS

BACKGROUND OF THE INVENTION

1. Field of the Invention

This invention relates to new and useful improvements in systems or apparatus for protection of buildings from flooding.

2. Brief Description of the Prior Art

In the past, protection of buildings from floodings has been primarily accomplished by dikes or levies or the like. Also, temporary protection has been provided for buildings by construction of temporary dikes or devies by means of sandbags and the like. Buildings have been protected from overhead water by coverings.

Canopies and shields of canvas or of plastic film are known in the prior art for protection of various structures.

Thompson, U.S. Pat. No. 4,488,386 discloses a flood shield assembly for providing an exterior waterproof barrier for a building which includes a roll of flexible, waterproof material having its leading edge attached to the foundation of the building substantially below ground level and its other end attached to a wooden dowel. The remainder of the roll is stored in a box having a cover at ground level. The waterproof material is formed in one-piece and has an overall length which substantially corresponds to the exterior dimensions of the building with which it is employed.

Vaniman U.S. Pat. No. 1,057,366 discloses an overhead covered protection for housing dirigibles.

Sharbondy U.S. Pat. No. 1,279,596 discloses an overhead canvas or plastic film protection for motor vehicles.

Lacey U.S. Pat. No. 1,888,497 discloses canvas covers for open sided structures for supporting hay or grain. The canvas surrounds the structure to protect it from the weather.

Dakin U.S. Pat. No. 1,648,724 discloses an overhead canvas type enclosure for protecting the exterior of a building under construction from rain and other inclement weather.

Smith U.S. Pat. No. 3,323,530 discloses overhead and side canvas or plastic film protection from the weather in the form of a sportsman's blind.

Travis U.S. Pat. No. 3,503,566 discloses a plastic film or canvas canopy supported on a building to protect the same against weather.

The present invention is distinguished over the prior art, and these patents in particular by a system of flood protection for buildings consisting of a novel arrangement of sealing skirts of plastic film stored in enclosures on the building and extensible to be joined to form a waterproof enclosure for the building.

SUMMARY OF THE INVENTION

One of the objects of this invention is to provide a new and improved system or apparatus for protection of buildings from flood waters.

Another object of this invention is to provide an improved system or apparatus for protection of buildings from flooding by means of peripheral adjoining, vertically and horizontally extending plastic skirts sealed to the foundation of the building and protecting against intrusion of water up to a height greater than the projected rise of flood waters.

Another object of this invention is to provide a new and improved system or apparatus for protecting buildings from flood waters, which consists of separate upper, lower, and side skirts of plastic film surrounding the building, the lower skirt being sealed to the foundation, the upper skirt being supported at an upper level of the building, and the side skirts being supported and sealed at laterally spaced intervals on the building structure, said skirts being secured together by a releasable waterproof seal.

Another object of this invention is to provide a new and improved system or apparatus for protecting buildings from flood waters, where the skirts are secured together by a releasable seal which will allow water to pass therethrough upon a predetermined hydrostatic force to prevent structural damage of the building due to hydrostatic, hydrodynamic, or bouyancy forces which would exceed the structural limitations of the building.

Other objects of this invention will become apparent from time to time throughout the specification and claims as hereinafter related.

The above objects and other apparent objects of the invention are accomplished by a sytsem of flood protection for buildings comprising a lower skirt of plastic film secured by a waterproof seal to the building foundation, an upper skirt of plastic film secured to an upper level of the building above the maximum projected rise of flood waters, and side skirts secured at each side of the upper and lower skirts. The skirts form adjoining continuous enclosures which extend completely around the building and are of a size and shape permitting each skirt to be unfolded or unwound to meet the other. The edges of each skirt have waterproof seals, such as a zip-lock seal, for water proof sealing to protect the building against rising waters. Upper, lower, and side peripheral enclosures are provided on the building in which the respective skirts are stored when not in use. Alternatively, enclosures are provided only for the lower and side skirts. The lower skirt is secured at its lower edge by a waterproof seal to the building foundation and its upper edge is secured to series of fasteners on an upper level of the building above the maximum projected rise of flood waters. The side skirts are secured at each side of the lower skirt.

DESCRIPTION OF THE PREFERRED EMBODIMENT

Figure 1:
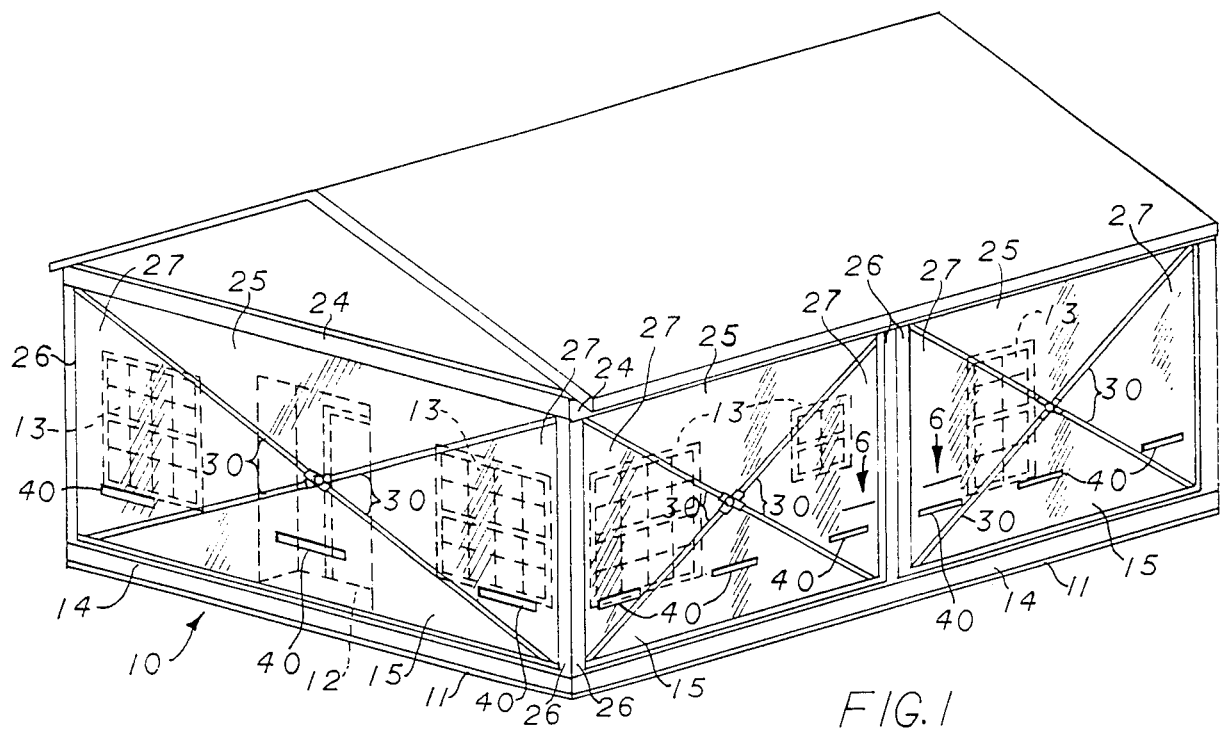
FIG. 1 is an isometric view of a building provided with a system or apparatus for flood protection representing a preferred embodiment of this invention.

This is a system or apparatus for temporarily protecting buildings from flooding. In FIG. 1, there is shown an isometric view of a building 10 provided with the flood protecting system or apparatus representing a preferred embodiment of this invention. Building 10 has a foundation 11 of concrete or other material. The building shown is for purposes of illustration only and is to be considered exemplary of the application of the invention to any building.

Figure 4:
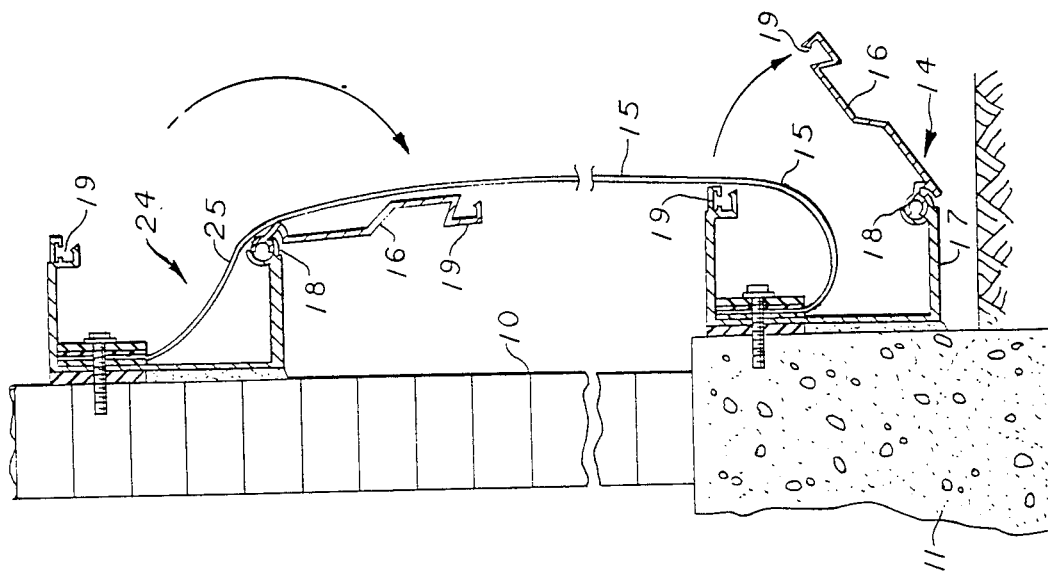
FIG. 4 is a sectional view of the building of FIG. 1 showing the upper and lower flood protecting skirts in position for protection against flood waters.
Figure 3:
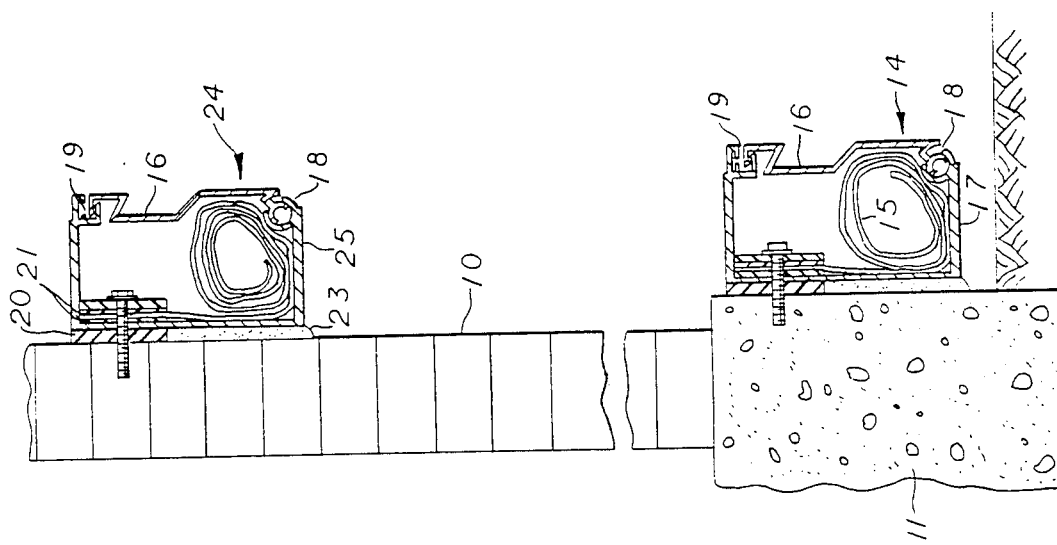
FIG. 3 is a sectional view of the building of FIG. 1 showing the upper and lower flood protecting skirts in the stored position.
Figure 2:
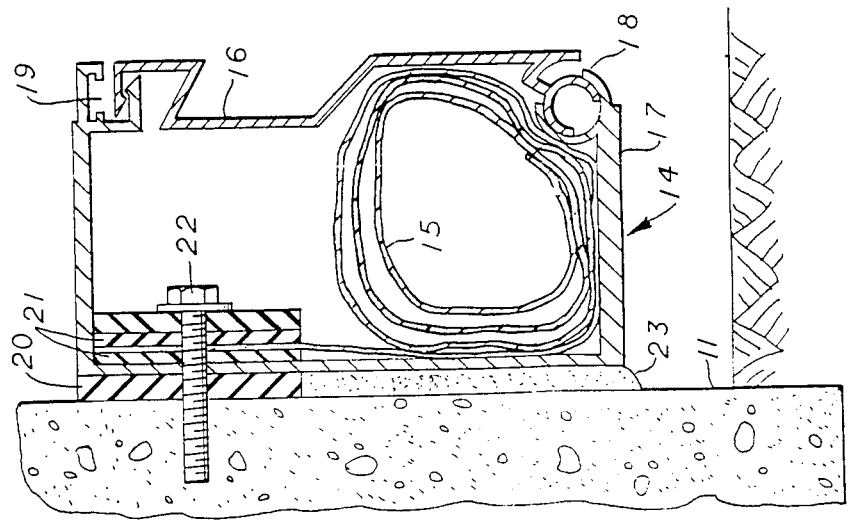
FIG. 2 is a sectional view of a portion of the building shown in FIG. 1, illustrating the lower enclosure for the flood protecting skirts for the building.

The building 10 is shown with a front door 12 and a plurality of windows 13. At the base of building 10, and surrounding the foundation 11, there are a plurality of adjoining lower enclosures 14 in which part of the flood protection system or apparatus is stored. As shown in FIGS. 2, 3, and 4, each lower enclosure 14 encloses a lower skirt 15 of plastic film, or the like, which is rolled or accordion pleated and supported within enclosure 14. One continuous edge of lower skirt 15 is secured to foundation 12 by a waterproof seal.

Lower enclosure 14 is an elongated box having a lid portion 16 pivotally joined along its bottom edge to a base housing portion 17 by a hinge 18 and releasably secured along its top edge to the base housing portion 17 as indicated at 19 by suitable securing means such as an interlocking snap connection or the like. An exterior sealing strip 20 is installed on the foundation at a suitable location above or below ground.

Strip 20 may be installed in the foundation when the slab is poured, or may be fastened after pouring by suitable means such as adhesive sealing agent, screws, or bolts. The interior edge of plastic film skirt 15 is sandwiched between a pair of interior sealing strips 21. Enclosure 14 and skirt 15 are sealed to foundation 11 and sealing strip 20 by suitable fasteners such as screws or bolts 22. An adhesive sealant 23 may be used where necessary for a watertight seal between the foundation 11 and the enclosure 14.

Figure 8:
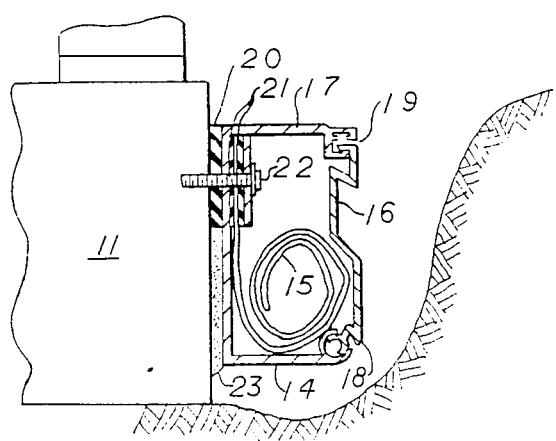
FIG. 8 is a sectional view of the building of FIG. 1 showing the relationship of a lower enclosure to the foundation and ground level of the building.

FIG. 8 shows a lower enclosure secured to the foundation below the ground level to extend the protective skirt barrier along the lower portion of the foundation and reduce the possibility of seepage therethrough.

At the upper level of the building 10, above the level of the windows 13 and above the maximum level of projected rise of flood waters, there is shown (FIG. 1) a plurality of adjoining upper enclosures 24 extending completely around the building periphery and each enclosing a downwardly extending upper plastic film skirt 25 which cooperates with the lower plastic film skirt 15 to provide a waterproof enclosure for the building.

Upper enclosure 24 is constructed similarly to the lower enclosure 14 and like parts have like reference numerals. An exterior sealing strip 20 is installed on the upper portion of the building exterior at a suitable location. The interior edge of plastic film skirt 25 is sandwiched between a pair of sealing strips 21. Enclosure 24 and skirt 25 are sealed to building 10 and sealing strip 20 by fasteners such as screws or bolts 22. An adhesive sealant 23 may be used where necessary for a watertight seal between the building 10 and the enclosure 24. Each upper skirt 25 is rolled or accordion pleated and supported within enclosure 24.

Figure 6:
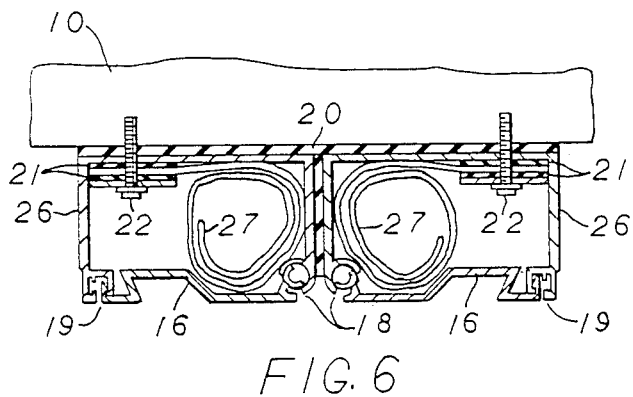
FIG. 6 is a sectional view taken on the line 6—6 of FIG. 5 showing the side flood protecting skirts in the stored position within the vertical enclosures.

As shown in FIGS. 1 and 6, a plurality of side enclosures 26 extend vertically, in laterally spaced relation, between the lower enclosure 14 and the upper enclosure 24 and enclose laterally extending side plastic film skirts 27 which cooperate with the upper and lower skirts 15 and 25 to provide a waterproof enclosure for the building. The side enclosures 26 are substantially the same construction as the lower and upper enclosures 14 and 24, and the same parts are assigned the same numerals of reference. An exterior sealing strip 20 is installed on the the building exterior at a suitable location.

The inner edge of each plastic film skirt 27 is sandwiched between a pair of sealing strips 21. The enclosures 26 and the skirts 27 are sealed to building 10 and sealing strips 20 by suitable fasteners such as screws or bolts 22. An adhesive sealant may be used for a watertight seal between the building 10 and the enclosure 26 (not shown). The side skirts 27, like the upper and lower lower skirts, are rolled or accordion pleated and supported within the enclosures 26 and extend laterally outward therefrom to join the upper and lower skirts.

Lower plastic film skirt 15, upper plastic film skirt 25, and side skirts 27 are triangular with the base portions (sealed edge) extending substantially the length of the enclosure and the apex extensible outward from the enclosure. The upper skirt 25 supported in upper enclosure 24 extends downwardly from the upper enclosure to approximately three feet above the ground level.

The upper plastic film skirt 25 secured in upper enclosure 24 extends downwardly therefrom to meet the upwardly extending edge of lower protecting skirt 15 and the side skirts 27 extend laterally to meet the upper and lower skirts. The lengths of upper and lower enclosures 24 and 14, and the spacing of side enclosures 26 are determined by the building periphery. Side enclosures 26 are installed at the corners where the foundation changes direction or where obstructions such as doorways or stairs occur. In this manner, portions of the building exterior are separated into water resistant compartments (FIG. 1). By installing the upper, lower, and side enclosures in abutting compartments, the building structure may be completely encircled with a waterproof barrier.

Figure 7:
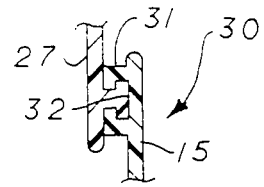
FIG. 7 is a detail sectional view taken on the line 7—7 of FIG. 5 showing the waterproof seal between the edges of the flood protecting skirts shown in FIG. 5.
Figure 5:
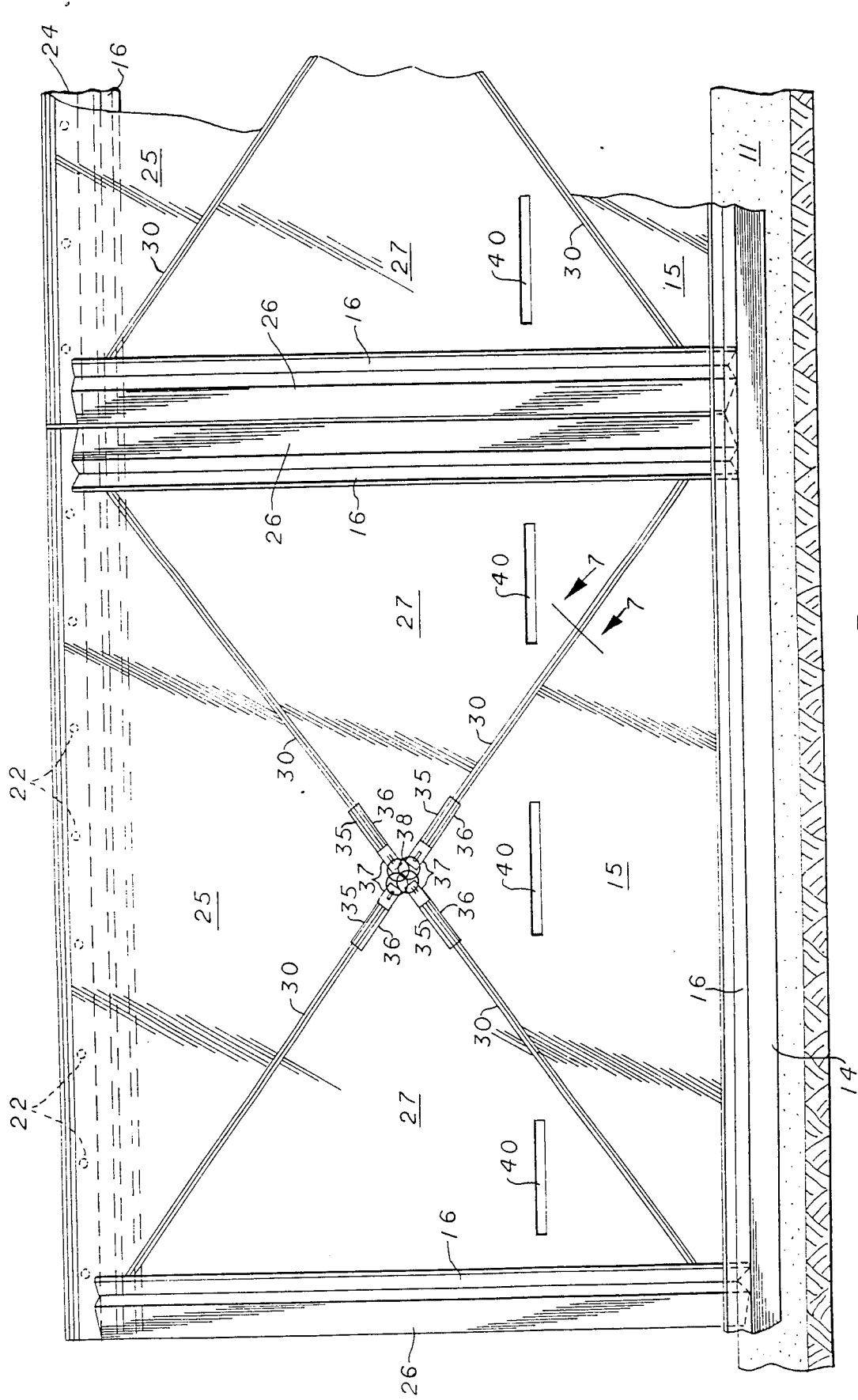
FIG. 5 is an elevational view of the flood protecting skirts when assembled to protect the building against flooding.

When the upper, lower, and side protecting skirts are extended to the protective position shown in FIG. 5, the mating edges of these skirts are secured together in a watertight or waterproof seal. The waterproof seal is preferably accomplished by means of a tongue-in-groove seal of the type used in some packaging films and known as a ZIPLOC construction. The seal 30 which joins upper and lower upper film or skirts 25 and 15 to side film or skirts 27 is illustrated in detail in section in FIGS. 7 and 9. In these views, it is seen that the upper edge portion of lower plastic film skirt 15 is provided with a continuous groove 31 into which fits continuous tongue or rib 32 of the lower edge portion of the side plastic film skirt 22. The details of the seal construction of the upper skirts 25 is the same that of the lower skirt 15.

Figure 9:
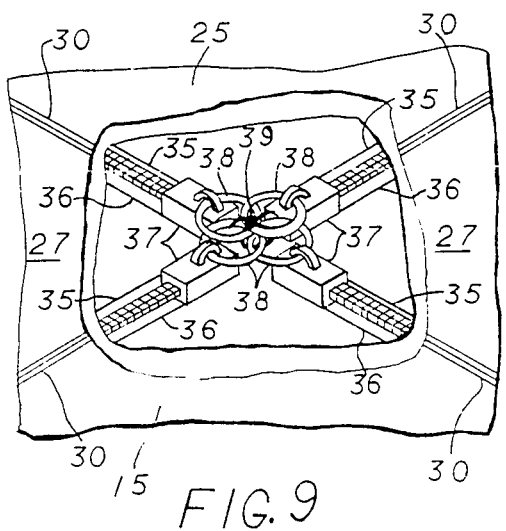
FIG. 9 is a partial elevational view of the fasteners when the flood protecting skirts are in the assembled protective position.

This tongue-in-groove seal of joint 30 is one which is easily and quickly assembled by bringing the edges of skirts 15, 25, and 27 together and pressing tongue or rib 32 into groove 31. This can be done rapidly around the entire building. Additionally, seal or joint 30 may be reinforced by a pair of reinforcing strips 35 and 36 (only partially shown) extending a distance along the intersecting leading edge of the skirts or all along the length of joints 30, which are connectable by edge zipper 37 giving physical strength to the tongue-in-groove joints 30 to prevent separation by wind or other forces. The assembly is completed when zippers 37 are fastened along the diagonal intersecting portions of the mating skirts. Zippers 37 may have pull rings 38 tied or otherwise secured together as indicated at 39 (FIG. 9).

As shown in FIGS. 1 and 5, each lower and side skirt may be provided with a rectangular slot 40 at approximately three to four feet above the foundation which will provide a means of allowing the water to bypass the protective skirts to prevent structural damage to the building caused by the hydrostatic head forces of the rising water. The tongue-in-groove seal or joint 30 may be sized to provide a self holding waterproof joint when pressed together but which will separate upon predetermined hydrostatic pressure exceeding the structural capacity of said building allowing flood waters to enter said building to prevent structural damage thereto.

Figure 10:
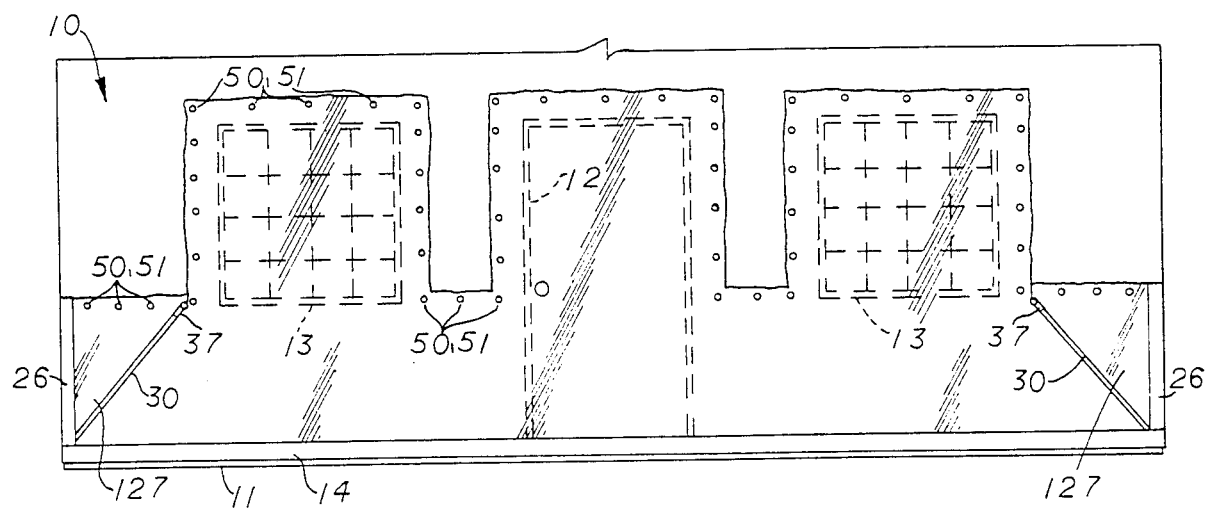
FIG. 10 is a partial elevation of a building provided with a modified system or apparatus for flood protection in accordance with the present invention.
Figure 12:
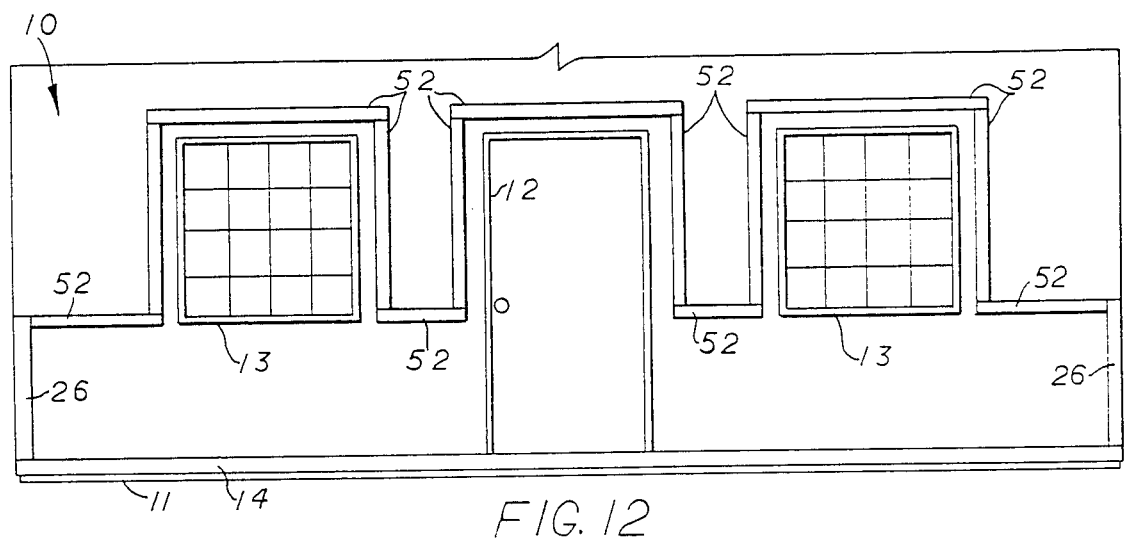
FIG. 12 is a partial elevational view of the flood protecting system of FIG. 10 with the skirts in the stored position.
Figure 11:
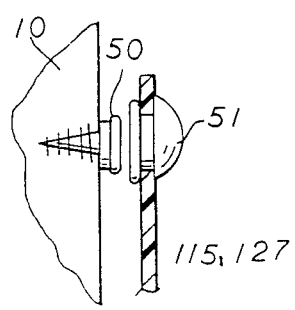
FIG. 11 is a detail sectional view taken on the line 11—11 of FIG. 10 showing the attachment means of the modified system.

Referring now to FIGS. 10 through 13, a modification of the previously described flood protection system will be described. The components previously described are designated by the same numerals of reference. Building 10 is shown with front door 12 and a plurality of windows 13. FIG. 10 illustrates the protective skirts in use and FIG. 12 shows the skirts in the stored position. At the base of building 10, and surrounding foundation 11, are a plurality of adjoining lower enclosures 14 for storing part of the flood protection system or apparatus. As previously described and shown in FIG. 2, each lower enclosure 14 encloses a lower skirt of plastic film, or the like, which is rolled or accordion pleated and supported within enclosure 14. The modified lower skirt 115 has continuous edge secured to foundation 11, as previously described, by a waterproof seal.

A plurality of laterally spaced fastener elements 50, such as snap type fasteners (FIG. 11) are attached to the building in a line which extends completely around the building following the upper portions of the windows and doorways. The lowermost line of fasteners 50 are preferably about three to four feet above the ground level of the building 10, except the portions which outline the windows and doorways. The fasteners are above the maximum level of projected rise of flood waters, and at a height allowing the flood waters to bypass the waterproof barrier and prevent structural damage to the building caused by the hydrostatic head forces of the rising water beyond a predetermined level.

As shown in FIGS. 10 and 12, side enclosures 26 extend vertically between the lower enclosure 14 and the lowermost line of fasteners 50 and enclose laterally extending side plastic film skirts 127 which cooperate with the lower skirts 115 in a waterproof enclosure for the building. Side enclosures 126 are substantially the same construction as previously described, except for their length.

The interior edge of each lower and side plastic film skirt is sandwiched between a pair of sealing strips and the enclosures and skirts are sealed to the building and sealing strips by suitable fasteners as previously described and an adhesive sealant may be used where necessary for a watertight seal between the building and the enclosures (shown previously). The side skirts 127, like the lower skirts, are rolled or accordion pleated and supported within enclosures 126 and extend laterally outward to join the lower skirts.

Lower plastic film skirt 115 is generally rectangular in shape with extended portions matching the window and doorway outline. The base portion (sealed edge) extends substantially the length of the enclosure and side edges extend angularly upward and inward. Side plastic film skirts 127 are triangular with the base portions (sealed edge) extending substantially the length of the enclosure and the apex extensible outward from the enclosure. The lower edge of side skirts 127 extend angularly upward and inward to meet side edges of lower skirt 115. Mating fastener elements 51 extend along the top edge of lower skirt 115, and along the top edge of side skirts 127.

Lower skirt 115, supported in lower enclosure 14, extends upwardly for fastening to the line of fasteners 50 above the ground level. The side skirts 127 extend laterally to meet the lower skirts and to be fastened to the line of fasteners. When the lower and side protecting skirts are extended to the protective position shown in FIG. 10, the mating edges of these skirts are secured together in a watertight or waterproof seal. The waterproof seal is preferably accomplished by means of a tongue-in-groove seal of the type used in some packaging films and known as a ZIPLOC construction. Seal 30 which joins lower film or skirts 115 to side film or skirts 127 has been previously described with reference to FIGS. 7 and 9. In these views, it is seen that the upper edge portion of the lower plastic film skirt is provided with a continuous groove into which fits continuous tongue or rib of the lower edge portion of the side skirt.

This tongue-in-groove seal or joint 30 is easily and quickly assembled by bringing the edges of the skirts together and pressing tongue or rib into groove. This can be done rapidly around the entire building. Additionally, the seal or joint 30 may be reinforced by reinforcing strips 35 and 36 (FIG. 9) along the intersecting leading edge of the skirts or all along the length of joints 30, and connectable by edge zipper 37. This zipper 37 is provided to give physical strength to the tongue-in-groove joints 30 to prevent separation by wind or other forces. The assembly is completed when zippers 37 are fastened along the diagonal intersecting portions of the mating skirts.

Figure 13:
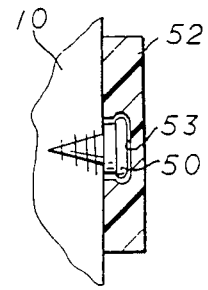
FIG. 13 is a detail sectional view taken on the line 13—13 of FIG. 12 showing the attachment means of the modified system covered with decorative trim.

As shown in FIGS. 12 and 13, after the threat of flooding has passed, skirts 115 and 127 are rolled or folded and stored within enclosures 14 and 126. Elongated decorative trim strips 52 are installed over the fasteners 50. As shown in FIG. 13, the backside of the strips 52 have suitable fastener receiving means such as a longitudinal groove 53 which snap fits over the head of the snap fastener 50. Thus, when the skirts are stored the fasteners are hidden from view by the decorative trim strips 52 which are quickly and easily removed to connect the protective skirts at the first sign of flooding.

Figure 14:
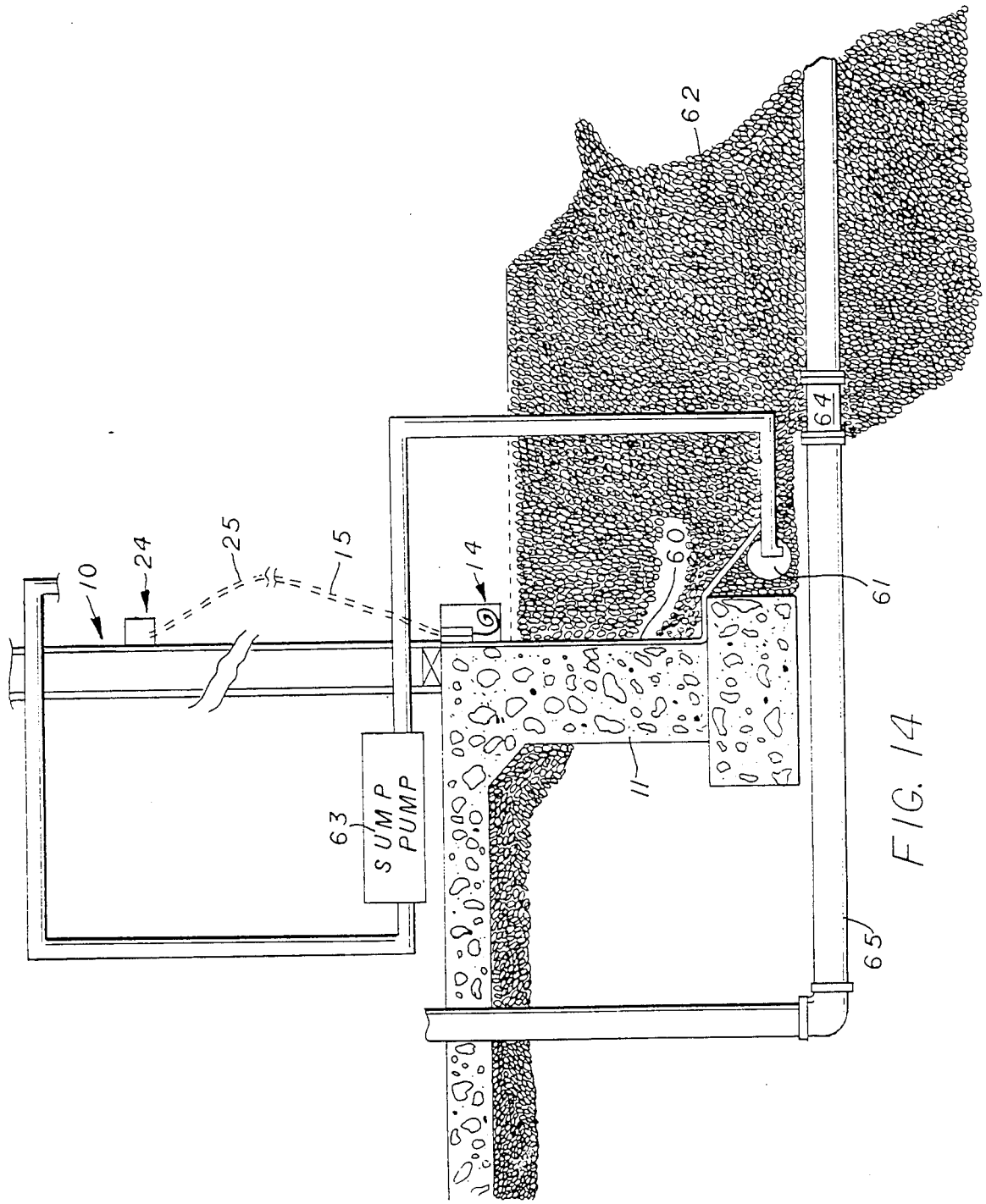
FIG. 14 illustrates the protective film system used in combination with a drainage system to reduce the flow of water under the slab.

As shown in FIG. 14 the protective film system may be used in combination with a drainage system to reduce the flow of water under the slab thus reducing the floating affect on the buildng structure. Plastic film 60 is extended beneath the ground level several feet. At the base of film 60 is a drainage system comprising drainage pipe 61 surrounded by loose gravel 62. All water entering the drain pipe 61 will be evacuated by a sump pump 63 and ejected exterior of the structure. Also, check valve 64 may be installed in main waste line 65 to prevent flooding from within due to back surge from the sewer system. The check valve may be either a passive one way valve or a manual screw type.

OPERATION

The operation of the modified flood protection system or apparatus should be obvious from the foregoing description and the operation of the earlier described embodiment will be restated for clarity and greater understanding of the application of this invention.

When there is danger of flooding, the enclosures are opened completely around the building to the position shown in FIG. 5 which allows upper protective skirt 25 to unroll or unfold to extend downward. Each side skirt 27 is unrolled or unfolded to join upper skirt 25 along the waterproof seal 30. The lower skirt 15 is unrolled or unfolded and pulled upward to join side skirts 27 along the waterproof seal 30. The releasable peripheral seal is formed between upper and side protective skirts and lower and side protective skirts along the lower portion of the building, as shown in FIG. 5, and the seal continues along the diagonally extending mating edges.

Reinforcing strips 35 and 36 are connected and zippers 37 are fastened along the diagonal intersecting portions of the mating skirts and pulled to the center. Zipper rings 38 are tied or otherwise secured together to reinforce the seal and prevent the skirts from separating. The waterproof cover which is thus provided will resist intrusion by a substantial head of water of predetermined height for a considerable length of time. The seal is watertight between the peripherally extending skirts and is watertight between the peripherally extending skirts and is watertight where the enclosures are sealed to the building and foundation.

The slots provide a means of allowing the water to bypass the protective skirts to prevent structural damage to the building caused by the hydrostatic head forces of the rising water and the tongue-in-groove seals or joints provide a self holding waterproof joint when pressed together but which will separate upon predetermined hydrostatic pressure exceeding the structural capacity of said building allowing flood waters to enter said building to prevent structural damage thereto.

While this invention has been described fully and completely with special emphasis upon several preferred embodiments, it should be understood that within the scope of the appended claims the invetion may be practiced otherwise than as specifically described herein.

I claim:

1. A system of flood protection for a building having a foundation comprising the combination with said building of;
   a lower continuous skirt of plastic film secured to said building foundation by a waterproof seal,
   means secured to said building in a fixed position enclosing and supporting said lower plastic film skirt in a rolled or folded condition adjacent to said foundation,
   an upper continuous skirt of plastic film secured to an upper level of said building above the maximum projected rise of flood waters,
   means secured to said building in a fixed position enclosing and supporting said upper plastic film skirt on said building in a rolled or folded condition at said upper level,
   a pair of side skirts of plastic film secured to said building exterior adjacent each end of said upper and said lower skirt supporting means by a waterproof seal, and
   means secured to said building in laterally spaced fixed vertical positions enclosing and supporting said side plastic film skirts in a rolled or folded condition adjacent said building exterior,
   said upper, said lower, and said side plastic film supporting means each being easily opened to permit said upper, said lower, and said side plastic films to be unrolled or unfolded toward each other, and
   said lower, said upper, and said side plastic film skirts each extending around said building and each having edge portions providing a waterproof seal with the other and being of a size and shape permitting said edges to be quickly joined in a water tight seal to prevent flood waters from entering said building.

2. A flood protection system according to claim 1 in which
   said lower, said upper, and said side plastic film skirt edge portions providing a waterproof seal with the other and being of a size and shape permitting said edges to be quickly joined in a water tight seal,
   said water tight seal providing a self holding waterproof joint when pressed together and which will separate upon predetermined hydrostatic pressure exceeding the structural capacity of said building allowing flood waters to enter said building to prevent structural damage thereto.

3. A flood protection system according to claim 1 in which
   said lower, upper, and side plastic film skirts are triagular in shape having their base portions extending substantially the length of their respective enclosure and their apex portions extensible outward from said enclosures,
   said upper skirt extending downwardly from said upper enclosure, said lower skirt extending upwardly from said lower enclosure to meet the downwardly extending apex portion of said upper skirt, and said side skirts extending laterally to meet the apex portions of said upper and lower skirts, the apex portions of said skirts meeting a distance above the projected rise of flood waters,
   said waterproof joint provided by joining said lower, said upper, and said side plastic film skirt side edge portions and sized to allow flood waters to pass therethrough upon the flood waters reaching a predetermined height to prevent structural damage to said building.

4. A flood protection system according to claim 1 in which
   said plastic film skirts when joined at their side edges form water resistant compartments, and said compartments when installed in abutting relation substantially encircle said building.

5. A flood protection system according to claim 1 in which
said plastic film skirts when joined at their side edges form water resistant compartments, and
said compartments when installed in abutting relation substantially encircle said building, and
at least one of said plastic film skirts having bypass means at a predetermined distance above the building foundation which allows water to pass through said skirt to prevent structural damage to the building caused by hydrostatic forces of the rising water exceeding the structural capacity of said building.

6. A flood protection system according to claim 1 in which
said lower and side plastic film skirts having bypass means at a predetermined distance above the building foundation allowing water to pass through said skirts to prevent structural damage to the building caused by hydrostatic head forces of the rising water exceeding the structural capacity of said building.

7. A flood protection system according to claim 1 in which
said plastic film edge portions providing a waterproof seal comprise a continuous tongue or rib on one edge portion and a continuous groove on the other edge portion, and
said tongue and groove being sized to provide a self holding waterproof joint when pressed together.

8. A flood protection system according to claim 7 in which
said tongue and groove being sized to provide a self holding waterproof joint when pressed together and separable upon predetermined hydrostatic pressure exceeding the structural capacity of said building allowing flood waters to enter said building to prevent structural damage thereto.

9. A flood protection system according to claim 7 in which
said apex portions of said skirts meeting a predetermined distance above said building foundation to allow flood waters to pass therethrough upon reaching said distance to prevent structural damage to said building.

10. A flood protection system according to claim 7 including
reinforcing strips extending around the edges of said waterproof seal and joined by a series of mechanical zippers to provide additional physical strength to said seal.

11. A flood protection system according to claim 10 wherein
said zippers are releasably secured together at the apex portions of said plastic skirt panels to prevent accidental separation of said seal.

12. A flood protection system according to claim 1 in which
said upper, lower, and side supporting means comprise continuous enclosures extending around said building, each having an easily opened cover for quick release of the respective plastic film skirts to seal said building against rising flood waters.

13. A flood protection system according to claim 1 in which
said upper plastic film skirt is secured on said building above the upper window line of said building.

14. A flood protection system according to claim 1 in which
said lower enclosure is secured to the foundation below the ground level.

15. A flood protection system according to claim 1 in which
said upper, lower, and side plastic film skirts are each supported on said building in an initially accordion pleated relation to provide for quick release to cover the threatened portion of said buiding to secure the same against flooding.

16. A flood protection system according to claim 1 in which
said upper, lower, and side plastic film skirts are each supported on said building in an initially accordion pleated relation to provide for quick release to cover the threatened portion of said building,
said upper plastic film skirt is secured on said building above the upper window line of said building,
said upper, lower, and side supporting means comprise continuous enclosures extending around said building, each having an easily opened cover for quick release of the respective plastic film skirts to seal said building against rising flood waters,
said plastic film edge portions providing a waterproof seal comprise a continuous tongue or rib on one edge portion and a continuous groove on the other edge portion, and
said tongue and groove being sized to provide a self holding waterproof joint when pressed together.

17. A flood protection system according to claim 16 in which
each continuous enclosure comprises a channel shaped enclosure with an easily opened substantially continuous cover opening in a direction permitting unfolding the respective plastic film skirts therefrom without interfering with said skirts covering the flood threatened portion of said building.

18. A flood protection system according to claim 1 including;
a plastic film attached to said lower skirt and extending downwardly a distance beneath the ground level,
an elongated drainage pipe disposed beneath the ground at the bottom end of said film,
pump means disposed within the building operatively connected to said drainage pipe for evacuating the contents of said drainage pipe and ejecting it exterior of the building, and
check valve means installed within the main waste line of the building to prevent flooding of the structure from within due to back surge from the building sewer system.

19. A system of flood protection for a building having a foundation comprising the combination with said building of;
a lower continuous skirt of plastic film secured to said building foundation by a waterproof seal,
means secured to said building in a fixed position enclosing and supporting said lower plastic film skirt in a rolled or folded condition adjacent to said foundation,
a pair of side skirts of plastic film secured to said building exterior adjacent each end of said lower skirt supporting means by a waterproof seal, and
means secured to said building in laterally spaced fixed vertical positions enclosing and supporting said side plastic film skirts in a rolled or folded condition adjacent said building exterior, said lower and said side plastic film supporting means each being easily opened to permit said lower and said side plastic film skirts to be unrolled or unfolded and extended outwardly therefrom, said lower skirt extending upwardly from said securing means and said side plastic skirts extending laterally toward said lower skirt, fastener means secured to an upper level of said building above the maximum projected rise of flood waters for releasably receiving and supporting said lower and said side plastic film skirts in their extended position, said lower and said side plastic film skirts each each having at least one edge portion providing a waterproof seal with the other and being of a size and shape permitting said edges to be quickly joined in a water tight seal to prevent flood waters from entering said building, said lower and said side plastic film skirts each having an upper edge portion adapted to be received on said fastener means.

20. A flood protection system according to claim 19 in which said lower and said side plastic film skirt edge portions providing a waterproof seal with the other and being of a size and shape permitting said edges to be quickly joined in a water tight seal, said water tight seal forming a self holding waterproof joint when pressed together and which will separate upon predetermined hydrostatic pressure exceeding the structural capacity of said building allowing flood waters to enter said building to prevent structural damage thereto.

21. A flood protection system according to claim 19 in which said lower plastic film skirt is generally rectangular in shape having its lower edge portion extending substantially the length of its enclosure and the upper edge portion extensible outward from said enclosures, said side plastic film skirts are triagular in shape having their base portions extending substantially the length of their respective enclosure and their apex portions extensible outward from said enclosures, said lower skirt extending upwardly from said lower enclosure to be attached at its upper edge to said fastener means, and said side skirts extending laterally to meet the side edges of said lower skirt, said waterproof joint provided by joining said lower and said side plastic film skirt side edge portions and sized to separate upon predetermined hydrostatic pressure exceeding the structural capacity of said building allowing flood waters to enter said building to prevent structural damage thereto.

22. A flood protection system according to claim 19 in which said plastic film skirts when joined at their side edges form water resistant compartments, said compartments when installed in abutting relation substantially encircle said building, and the lowermost line of said fastener means located at selected distance above the building foundation to allow water to pass over said skirts to prevent structural damage to the building caused by hydrostatic forces of the rising water exceeding the structural capacity of said building.

23. A flood protection system according to claim 19 including a series of elongated decorative trim strips adapted to be removably installed over said fastener means.

24. A flood protection system according to claim 19 in which said fastener means comprise series of laterally spaced snap type fastener elements attached to said building in a line which extends substantially around said building and follows the upper portions of the windows and doorways, and the upper edges of said lower and side plastic film skirts are provided with a series of laterally spaced mating snap type fastener elements.

25. A flood protection system according to claim 19 in which said plastic film edge portions providing a waterproof seal comprise a continuous tongue or rib on one edge portion and a continuous groove on the other edge portion, and said tongue and groove being sized to provide a self holding waterproof joint when pressed together.

26. A flood protection system according to claim 25 in which said tongue and groove being sized to provide a self holding waterproof joint when pressed together and which will separate upon predetermined hydrostatic pressure exceeding the structural capacity of said building allowing flood waters to enter said building to prevent structural damage thereto.

27. A flood protection system according to claim 25 including reinforcing strips extending around the edges of said waterproof seal and joined by a series of mechanical zippers to provide additional physical strength to said seal.

28. A flood protection system according to claim 19 in which said lower and side supporting means comprise continuous enclosures extending around said building, each having an easily opened cover for quick release of the respective plastic film skirts to seal said building against rising flood waters.

29. A flood protection system according to claim 28 in which said continuous enclosures each comprises a channel shaped enclosure with an easily opened substantially continuous cover which opens in a direction permitting unfolding the respective plastic film skirts without interfering with said skirts covering the flood threatened portion of said building.

30. A flood protection system according to claim 19 in which the lowermost line of said fastener means disposed at a predetermined distance above the building foundation and the uppermost line of said fastener means disposed above the upper window line of said building, and said lower plastic film skirt is generally rectangular in shape with extended portions matching the window and doorway outline, and said lower plastic film skirt extended portions are secured on said fastener means above the upper window line of said building.

31. A flood protection system according to claim 19 in which said lower enclosure is secured to the foundation below the ground level.

32. A flood protection system according to claim 19 in which said lower and side plastic film skirts are each supported on said building in an initially accordion pleated relation to provide for quick release to cover the threatened portion of said building to secure the same against flooding.

33. A flood protection system according to claim 19 including;

a plastic film attached at its top edge to said lower and extending downwardly a distance beneath the ground level, an elongated drainage pipe disposed beneath the ground at the bottom end of said film, pump means disposed within the building operatively connected to said drainage pipe for evacuating the contents of said drainage pipe and ejecting it exterior of the building, and check valve means installed within the main waste line of the building to prevent flooding of the structure from within due to back surge from the building sewer system.

* * * * *